United States Patent [19]
Baremor

[11] 3,938,408
[45] Feb. 17, 1976

[54] DIFFERENTIAL DRIVE MECHANISM

[75] Inventor: Jerry F. Baremor, Marshall, Mich.

[73] Assignee: Eaton Corporation, Cleveland, Ohio

[22] Filed: Feb. 10, 1975

[21] Appl. No.: 548,711

Related U.S. Application Data

[63] Continuation of Ser. No. 374,532, June 28, 1973, abandoned.

[52] U.S. Cl. .............................. 74/711; 192/105 C
[51] Int. Cl.[2] ...................... F16H 1/44; F16D 23/10
[58] Field of Search..... 74/710.5, 711; 192/105 CD, 192/105 C, 105 CP, 105 CE, 89 W

[56] References Cited
UNITED STATES PATENTS

| | | | |
|---|---|---|---|
| 1,950,581 | 3/1934 | Thomas | 192/105 C |
| 2,109,420 | 2/1938 | Guernsey | 192/105 C X |
| 3,024,886 | 3/1962 | Peras | 192/105 CE |
| 3,291,274 | 12/1966 | Wymann | 192/105 C |
| 3,606,803 | 9/1971 | Ottemann | 74/711 |
| 3,625,326 | 12/1971 | Rix | 192/105 CE |
| 3,727,478 | 4/1973 | Erickson et al. | 192/105 C X |
| 3,831,462 | 8/1974 | Baremor | 74/711 |

Primary Examiner—Samuel Scott
Assistant Examiner—Parshofam S. Lall
Attorney, Agent, or Firm—Teagno & Toddy

[57] ABSTRACT

An improved differential drive mechanism includes a clutch assembly which is engaged to retard relative rotation between driving and driven members. A clutch actuator assembly includes a pair of flyweights which are rotated at a speed which varies as a function of variations in the speed of relative rotation between the driving and driven members. The flyweights are hinged to move outwardly under the influence of centrifugal force as they are rotated. To prevent excessive loading on hinge connection at high rotational speeds, outward movement of the flyweights is limited by a pair of stop members which engage outer surfaces of the flyweights. The flyweights are pivotally mounted on the stop members and the torque for rotating the flyweights is transmitted from an input shaft to the flyweights through the stop members. To prevent overloading of a flyweight drive mechanism, secondary clutches are provided between the stop members and input shaft.

13 Claims, 5 Drawing Figures

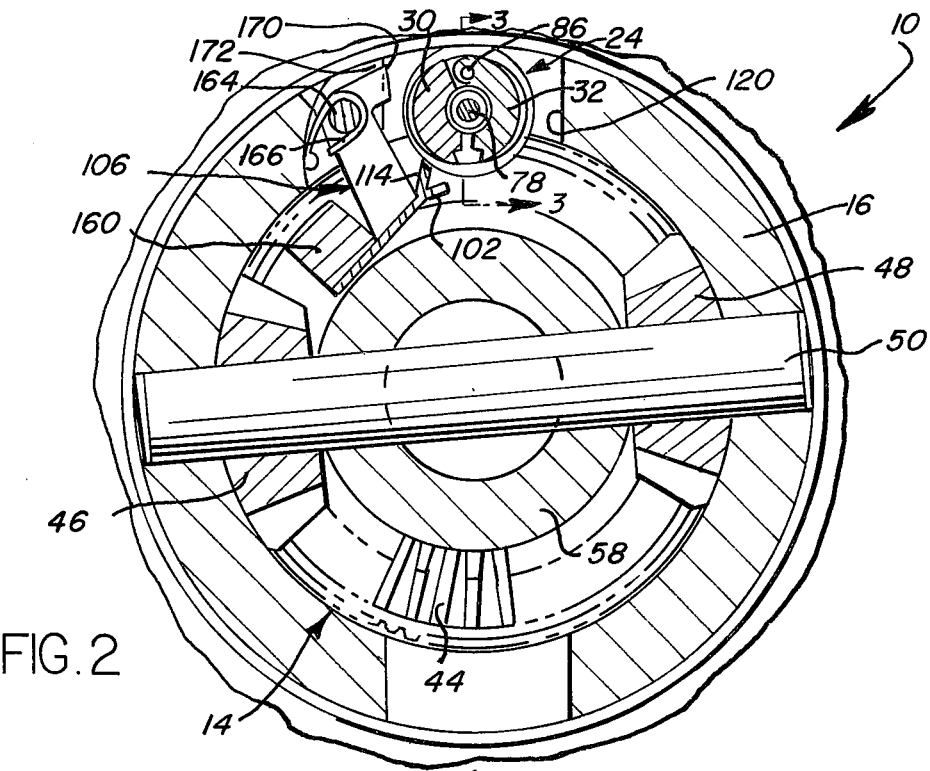
FIG.2
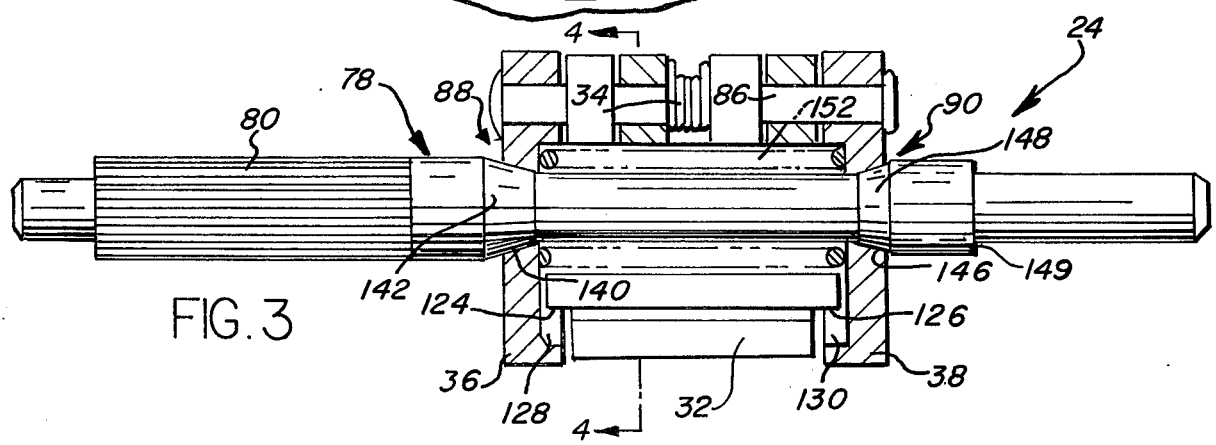
FIG.3
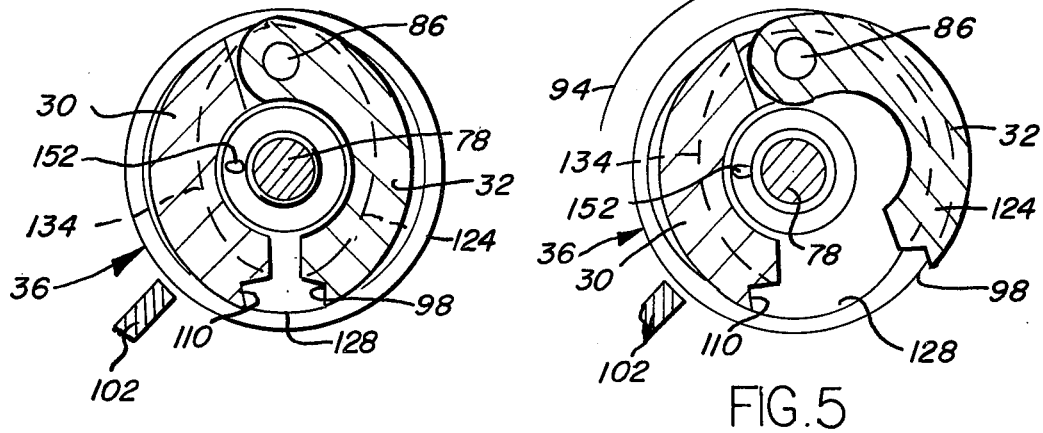
FIG.4
FIG.5

DIFFERENTIAL DRIVE MECHANISM

This is a continuation of application Ser. No. 374,532, filed June 28, 1973, now abandoned.

BACKGROUND OF THE INVENTION

This invention relates generally to a drive mechanism and more specifically to a slip limiting differential drive mechanism having a clutch assembly which is engaged in response to movement of one or more flyweights.

A known differential drive mechanism having a clutch assembly with is actuated in response to relative rotation between driving and driven members is disclosed in U.S. Pat. No. 3,606,803 issued to Ottemann. This differential drive mechanism includes an actuator assembly having a pair of flyweights. One of the flyweights is moved outwardly upon relative rotation between the driving and driven members. Although this known differential has proven to be more or less satisfactory in operation, difficulty may be encountered due to excessive loading on the hinge connection of the flyweights at high rotational speeds. Thus, when a relatively high degree of relative rotation occurs between the input and output members, the centrifugal force applied to the flyweights may be of such a magnitude as to damage this hinge connection. In addition, the stop members accurately control the maximum outward movement of the flyweights to eliminate interference with other portions of the differential mechanism.

SUMMARY OF THE INVENTION

The present invention relates to a drive mechanism having differential gearing which is enclosed within a carrier housing or casing. Upon the occurrence of relative rotation between input and output members, an actuator assembly effects operation of a clutch to an engaged condition to retard the relative rotation. This actuator assembly includes one or more flyweights which are movable outwardly from their center of rotation under the influence of centrifugal force. Since the drive mechanism is of a relatively compact construction, if the flyweights are allowed to move outwardly in an unrestrained manner they may create excessive loads on the hinge connection and interference with other portions of the differential mechanism. In accordance with the present invention, a stop arrangement is provided for accurately limiting the extent of flyweight movement and for absorbing this type of excessive loading.

The stop arrangement includes a pair of stop members which engage outer surfaces on the flyweights to limit their outward movement. The flyweights are pivotally mounted on the stop members which are rotated through secondary clutches at a speed corresponding to the speed of relative rotation between the input and output members. The secondary clutches prevent the transmission of excessive torque forces to and from the flyweights. The load on the pivot connection between the flyweights and stop members is reduced when a flyweight engages a stop surface formed on a stop member.

Accordingly, it is an object of this invention to provide a new and improved drive mechanism which includes a clutch which is engaged in response to outward movement of a flyweight and wherein a stop arrangement is provided to accurately limit the extent of outward movement of the flyweight.

Another object of this invention is to provide a differential drive assembly having input and output members which are interconnected by differential gearing disposed within a casing having a clutch which is engaged in response to outward movement of a flyweight toward the casing under the influence of centrifugal force and wherein a stop surface is disposed outwardly of the flyweight to absorb a portion of the loading on a hinge connection once a predetermined degree of outward movement of the flyweight has been achieved.

BRIEF DESCRIPTION OF THE DRAWINGS

The foregoing and other objects and features of the present invention will become more apparent upon a consideration of the following description taken in connection with the accompanying drawings wherein:

FIG. 2 is a sectional view, taken generally along the line 2—2 of FIG. 1, illustrating the relationship between differential gearing, a casing or housing, and an actuator assembly constructed in accordance with the present invention;

FIG. 3 is an enlarged sectional view, taken generally along line 3—3 of FIG. 2, further illustrating the construction of the actuator assembly;

FIG. 4 is a sectional view, taken generally along the line 4—4 of FIG. 3, illustrating the relationship between a pair of retracted flyweights and a stop tab which is effective to limit outward movement of the flyweights under the influence of centrifugal force; and FIG. 5 is a sectional view, generally similar to FIG. 4, illustrating the relationship between the stop tab and the flyweights when one of the flyweights is in an extended condition.

DESCRIPTION OF ONE PREFERRED EMBODIMENT OF THE INVENTION

Figure 1:
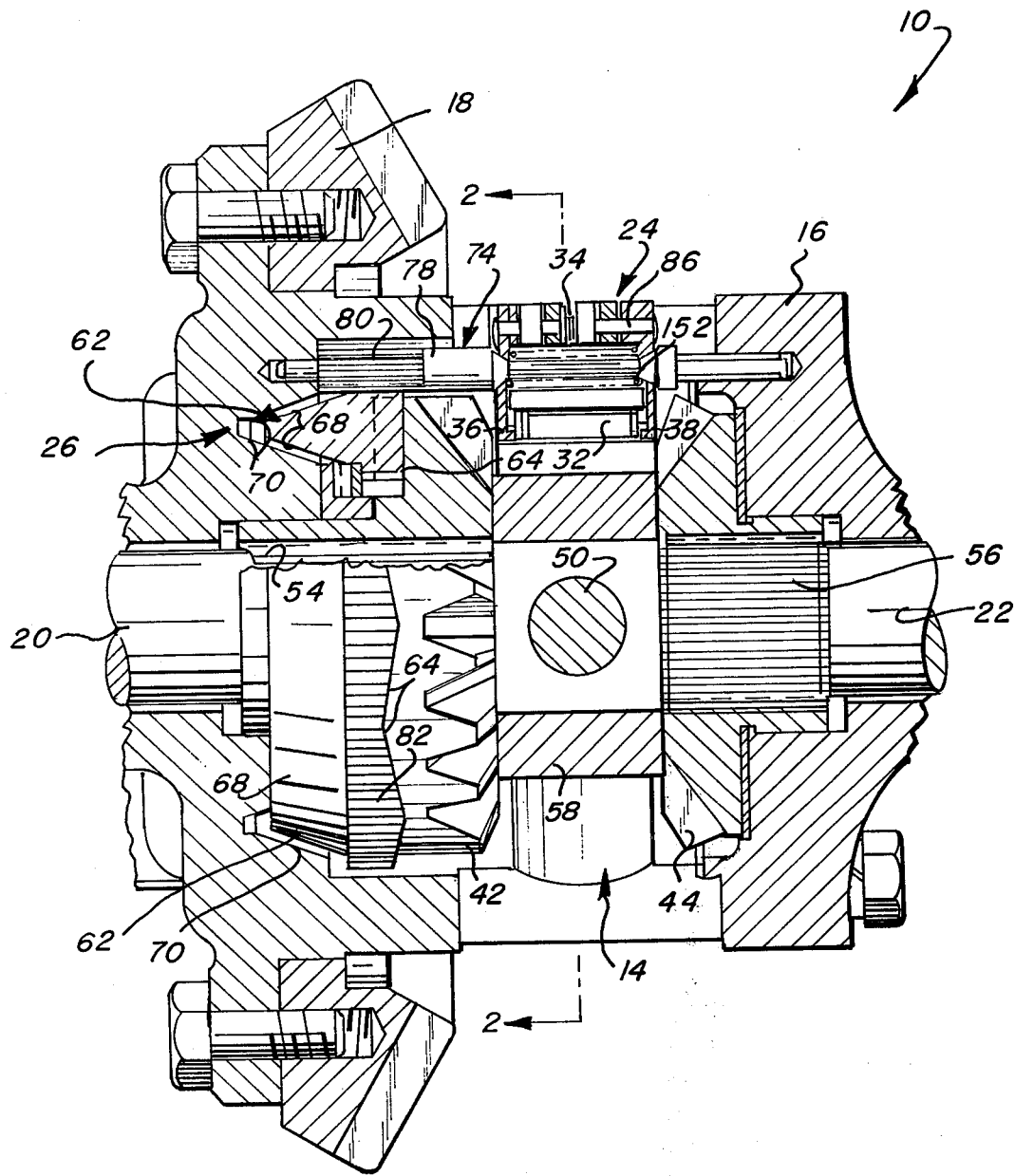
FIG. 1 is a sectional view of a differential drive mechanism constructed in accordance with the present invention.

A differential drive assembly 10 constructed in accordance with the present invention is illustrated in FIG. 1 and includes differential gearing 14 which is disposed within a casing or carrier housing 16 to drivingly connect a ring gear 18 with a pair of driven axle shafts 20 and 22. Upon the occurrence of a predetermined rate of rotation of one of the axle shafts 20 or 22 relative to the other and the ring gear 18, an actuator assembly 24 effects operation of a main clutch assembly 26 to an engaged condition to retard the relative rotation between the axle shafts and ring gear.

The actuator assembly 24 includes a pair of flyweights 30 and 32 (FIG. 2) which are urged to the retracted position of FIGS. 2 and 4 by a biasing spring 34 (FIG. 3). Upon the occurrence of relative rotation between the axle shafts 20 and 22 and ring gear 18, one of the flyweights 30 or 32 is moved outwardly toward the casing 16 against the influence of the biasing spring 34. In accordance with the present invention, a pair of stop members 36 and 38 (see FIG. 3) are provided to accurately limit the outward movement of the flyweights 30 and 32 so that they do not interfere with the other portions of the drive mechanism and to limit the loading on the hinge connection.

During operation of the vehicle with which the differential drive assembly 10 is associated, the ring or input gear 18 is rotated by a drive pinion (not shown). Upon rotation of the ring gear 18, the casing 16 is rotated. Assuming that the wheels of the vehicle and axle shafts 20 and 22 are being rotated at the same speed, drive forces are transmitted from the casing 16 to a pair of side gears 42 and 44 (FIG. 1) by pinion gears 46 and 48 (FIG. 2) which are connected with the casing 16 by a pinion shaft 50. The side gears 42 and 44 are connected with the axle or output shafts 20 and 22 (FIG. 1) by spline connections 54 and 56. A thrust block 58 is disposed between the side gears 42 and 44.

Upon a slipping of one of the wheels of the vehicle relative to the other, the associated axle shaft 20 or 22 and side gear 42 or 44 are accelerated relative to the other axle shaft and side gear. When this occurs, the actuator assembly 24 engages the main clutch assembly 26 by retarding rotation of an annular wedge member 62 (FIG. 1) relative to the casing 16. Retarding rotation of the wedge member 62 relative to the casing 16 causes cam or wedging ramps 64, formed on the side gear 42, to press the annular wedge member 62 toward the left (as viewed in FIG. 1). This leftward movement of the wedge member 62 causes a pair of clutch or wedge surfaces 68 on the wedge member 62 to move into tight frictional engagement with a mating pair of wedge surfaces 70 formed on the housing 16. Frictional forces transmitted between the wedge member 62 and the casing 16 at the clutch surfaces 68 and 70 retards relative rotation between the side gear 42 and casing 16. Since the side gear 44 is connected with the side gear 42 through the two pinion gears 46 and 48, relative rotation between the side gear 44 and the casing 16 is also retarded by engagement of the main clutch assembly 26.

The actuator assembly 24 is effective to operate the main clutch assembly 26 to the engaged condition upon the occurrence of a predetermined rate of relative rotation between one of the side gears 42 or 44 and the casing 16. The actuator assembly 24 includes a drive arrangement 74 (FIG. 1) which effects rotation of the flyweights 30 and 32 about a central axis of an input or drive member 78. The drive member on shaft 78 is rotatably mounted on the casing 16 and includes a plurality of gear teeth 80 which are disposed in meshing engagement with an annular array of gear teeth 82 on the wedge member 62. The flyweights 30 and 32 are pivotally mounted by hinge pin 86 on the stop members 36 and 38.

When relative rotation occurs between the side gear 42 and casing 16, the drive member 78 is rotated by the gear teeth 82. Rotation of the drive member 78 rotates the stop members 36 and 38 through secondary clutches 88 and 90 (FIG. 3). Since the flyweights 30 and 32 are pivotally mounted on the stop members 36 and 38, the flyweights 30 and 32 are rotated about the central axis of the drive member 78 with the stop members.

As the flyweights 30 and 32 are rotated about the central axis of the drive shaft 78, centrifugal force causes one of the flyweights to move outwardly toward the casing 16. Thus when the input member 78 is rotated in the direction of the arrow 94 in FIG. 5, centrifugal force causes the flyweight 32 to move outwardly from the retracted position of FIG. 4 to the fully extended position of FIG. 5. It should be noted that the flyweight 30 normally remains in the retracted position during clockwise (as viewed in FIGS. 4 and 5) rotation of the drve member 78 due to inertial forces upon acceleration.

As the flyweight 32 approaches the fully extended position of FIG. 5, an end notch 98 on the flyweight moves outwardly to engage a stop tab 102 during continued rotation of the flyweight. Upon engagement of the flyweight 98 with the stop tab 102, a stop assembly 106 (see FIG. 2) retards rotation of the drive member 78 and wedge member 62. When rotation of the wedge member 62 is retarded relative to the side gear 42, the cam or wedging surface 64 on the side gear press the wedge member 62 axially toward the left (as viewed in FIG. 1) to engage the main clutch assembly 26 and hold the side gear 42 against rotation relative to the casing 16.

Similarly, upon rotation of the flyweights 30 and 32 about the drive member 78 in a counterclockwise direction (as viewed in FIGS. 4 and 5), the flyweight 30 moves outwardly toward the casing 16 from the retracted position of FIG. 4. When the flyweight 30 reaches the extended position, an end notch 110 of the flyweight engages a second stop tab 114 (see FIG. 2) in the stop assembly 106. Of course, this retards rotation of the input member 78 and wedge member 62 to effect engagement of the main clutch assembly 26 in the manner previously explained. The manner in which the flyweights 30 and 32 move outwardly under the influence of centrifugal force and effect engagement of the clutch assembly 26 is the same as is described in U.S. Pat. No. 3,606,803 which is incorporated herein in its entirety by this reference thereto.

In accordance with the present invention, the stop members 36 and 38 limit the outward movement of the flyweights 30 and 32 under the influence of centrifugal force to thereby prevent the flyweights from impacting against the casing 16. Thus, if a flyweight 32 was allowed to move outwardly in an unrestrained manner upon rotation of the input shaft 78 in the direction of the arrow 94 (see FIG. 5), the flyweight 32 would cause an excessive loading of hinge 86 and might bang or impact against a shoulder 120 (FIG. 2) or other part of the casing 16. To prevent this from occurring, arcuate outer surfaces 124 and 126 (FIG. 3) on the stop member 32 move outwardly into engagement with annular stop surfaces 128 and 130 on the cup-shaped stop members 36 and 38. When the outer surfaces 124 and 126 on the flyweight 32 have engaged the stop surfaces 128 and 130, the flyweight is held against further outward movement.

Similarly, upon rotation of the input shaft 78 in a counter-clockwise direction (as viewed in FIGS. 4 and 5), the flyweight 30 will move outwardly until it engages the annular stop surfaces 128 and 130. Thus, as the flyweight 30 moves outwardly, an arcuate outer surface 134 of the flyweight moves into engagement with the annular stop surface 130. Similarly, an arcuate outer surface (not shown) on the opposite side of the flyweight 30 will move into engagement with the annular stop surface 128.

In addition to preventing the flyweight 30 and 32 from moving outwardly into engagement with casing 16, the stop members 36 and 38 are effective to transmit a drive torque from the input or drive shaft 78 to the flyweights 30 and 32 to rotate them about the central axis of the shaft 78. Thus, upon rotation of the input member 78, the secondary clutches 88 and 90 rotate the stop members 36 and 38 about the central axis of the input shaft. As the stop members 36 and 38 are rotated, one of the flyweights 30 or 32 tends to move outwardly about the hinge pin 86. It should be noted that once one of the flyweights 30 or 32 is moved into engagement with the stop surfaces 128 and 130, further increases in centrifugal force on the flyweights are absorbed by the collars on the stop members and the load on the hing pin 86 is thereby reduced. This is because part of the load is transmitted directly to the stop members 36 and 38.

The collars on stop members 36 and 38 are particularly effective to reduce loading on the hinge connection 86 because the location of the reaction load between the flyweights and the stop members is remotely located from the hinge connection. This remote location reduces the force required to resist further movement of the flyweights about the hinge connection by providing a long moment arm for the reaction force.

Further, the interior surface of the annular collar on stop members 36 and 38 may be configured to match the interacting surfaces 126 and 134 of flyweights 32 and 30 to thereby distribute the load and reduce contact stresses.

The secondary clutches 88 and 90 formed between the stop members 36 and 38 and the input shaft 78 prevent the gear teeth 80 on the input shaft from being overloaded upon engagement of one of the flyweights 30 or 32 with an associated one of the stop tabs 102 or 104. Thus, the clutch assembly 88 includes frustroconical clutch surfaces 140 and 142 (FIG. 3) on the stop member 36 and input shaft 78. Similarly, the secondary clutch 90 includes frustroconical clutch surfaces 146 and 148 formed on the stop member 38 and on a sleeve member 149 which is press fit on the input shaft 78. The clutch surfaces 140 and 146 on the stop members 36 and 38 are pressed against the clutch surfaces 142 and 148 on the input shaft 78 by a spring 152 which is disposed between the stop members in a coaxial relationship with the input shaft. Since slippage can occur between the stop members 36 and 38 and input shaft 78 upon the application of a predetermined torque load to the input shaft and stop members, the secondary clutch assemblies 88 and 90 limit the load which can be transmitted between the input shaft 78 and stop members to thereby limit their loading applied to the gear teeth 80.

Engagement of the clutch assembly 26 to retard relative rotation between the axle shafts 20 and 22 during high-speed operation of the vehicle could be detrimental to the handling of the vehicle and could damage the differential drive mechanism 10. Therefore, a weight 160 is connected with the stop tabs 102 and 114. Upon the occurrence of high-speed rotation of the ring gear 18 and casing 16, the weight 160 tends to move outwardly to pivot the stop tabs 102 and 114 about a support shaft 164 (see FIG. 2) against the influence of a biasing spring 166. As this occurs, a stop flange 170 moves away from a shoulder 172 on the casing 16 and the stop tabs 102 and 114 move away from the flyweights 30 and 32. The weight 160 moves outwardly to such an extent that the end notches 98 and 110 on the flyweights 30 and 32 can move freely past the stop tabs 102 and 114 even though the flyweights are extended position because their maximum outward position has been restricted by the collars on stop members 36 and 38.

In view of the foregoing description, it can be seen that the stop members 36 and 38 limit outward movement of the flyweights 30 and 32. In addition, the stop members 36 and 38 transmit torque from the input shaft 78 to the flyweights 30 and 32 to cause them to rotate about the central axis of the input shaft upon the occurrence of relative rotation between the casing 16 and the side gear 42. To prevent overloading of the teeth 80 on the input shaft 78, the secondary clutches 88 and 90 slip when a predetermined torque loading is applied to the input shaft. When one of the flyweights 30 and 32 moves into engagement with the stop members 36 and 38, the load on the hinge pin 86 tends to be reduced since reaction forces can be transmitted from the stop members 36 and 38 directly to the input shaft 78 independently of the hinge pin 86.

Having described a specific preferred embodiment of the invention, the following is claimed:

1. A drive mechanism for interconnecting rotatable driving and driven members, said drive mechanism comprising: gear means for transmitting drive forces between said driving and driven members and for enabling relative rotation to occur between said driving and driven members; main clutch means operable between an engaged condition in which said main clutch means is effective to retard relative rotation between said driving and driven members and a disengaged condition; and actuator means for effecting operation of said main clutch means from the disengaged condition to the engaged condition in response to a predetermined rate of relative rotation between the driving and driven members, said actuator means including a flyweight, an axially extending member mounted for rotation, drive means for rotating said axially extending member about its axis at an angular velocity which varies as a function of the relative rotation between the driving and driven members, a stop member mounted on said axially extending member for rotation therewith, support means for pivotally supporting said flyweight on said stop member for rotary movement therewith and for radially outward movement of at least a portion of said flyweight relative to said stop member away from the axis of rotation of said axially extending member under the influence of centrifugal force, means for effecting operation of said main clutch means from the disengaged condition to the engaged condition upon outward movement of said flyweight to a predetermined position, and stop means on said stop member for engaging said portion of said flyweight and limiting the extent of outward movement of said portion of said flyweight beyond said predetermined position to absorb at least a portion of the loading on said pivotal support.

2. A drive mechanism as set forth in claim 1 wherein said stop means includes an annular stop surface which circumscribes at least a portion of said flyweight.

3. A drive mechanism as set forth in claim 1 wherein said flyweight includes surface means for engaging said stop means when said flyweight is in said predetermined position.

4. A drive mechanism as set forth in claim 1 wherein: casing means at least partially enclose said gear means and said actuator means; said support means includes means for enabling said flyweight to move outwardly under the influence of centrifugal force through a distance sufficient to bring said flyweight into engagement with said casing means; and said stop means are effective to limit outward movement of said flyweight to a distance which is insufficient to enable said flyweight to engage said casing means.

5. A drive mechanism as set forth in claim 1 wherein said means for effecting operation of said main clutch means includes means for retarding rotation of said flyweight upon movement of said flyweight to said predetermined position.

6. A drive mechanism as set forth in claim 1 wherein said axially extending member is mounted for rotation in said driving member, said drive means includes an annular array of gear teeth on said axially extending member and an annular array of gear teeth rotatable with one of said driven members and in meshing engagement with said annular array of gear teeth on said axially extending member, said main clutch means is interposed between said driving member and one of said driven members, and said means for effecting operation of said main clutch means includes means for engaging said flyweight to retard rotation of said flyweight upon movement of said flyweight to said predetermined position.

7. A drive mechanism as set forth in claim 1 wherein said actuator means further includes secondary clutch means for enabling relative rotational movement to occur between said stop member and said axially extending member.

8. A drive mechanism as set forth in claim 7 wherein said secondary clutch means includes a first clutch surface disposed on said stop member and a second clutch surface disposed on said axially extending member and in abutting engagement with said first clutch surface.

9. A drive mechanism as set forth in claim 8 wherein said means for effecting operation of said clutch means includes means for engaging said flyweight and retarding rotation of said flyweight by said drive means upon movement of said flyweight to said predetermined position.

10. A drive mechanism as set forth in claim 1 wherein two axially spaced stop members are mounted on said axially extending member for rotation therewith, said support means pivotally supports said flyweight on both of said stop members for movement relative to said stop members, first clutch surfaces are disposed on each of said stop members, and second clutch surfaces are disposed on said axially extending member, each of said second clutch surfaces being in abutting engagement with one of said first clutch surfaces.

11. A drive mechanism as set forth in claim 10 wherein said first and second clutch surfaces are generally conical in configuration, and preloaded spring means are interposed between said stop members to bias each of said first clutch surfaces into engagement with said respective abutting second clutch surface.

12. A drive mechanism as set forth in claim 11 wherein said stop means includes an annular stop surface on each of said stop members which circumscribes said portion of said flyweight.

13. A drive mechanism for interconnecting rotatable driving and driven members, said drive mechanism comprising: gear means for transmitting drive forces between said driving and driven members and for enabling relative rotation to occur between said driving and driven members; main clutch means operable between an engaged condition in which said main clutch means is effective to retard relative rotation between said driving and driven members and a disengaged condition; and actuator means for effecting operation of said main clutch means from the disengaged condition to the engaged condition in response to a predetermined rate of relative rotation between the driving an driven members, said actuator means including a flyweight, an axially extending member mounted for rotation, drive means for rotating said axially extending member about its axis at an angular velocity which varies as a function of the relative rotation between the driving and driven members, support means for pivotally supporting said flyweight for rotation with said axially extending member and for radially outward movement of at least a portion of said flyweight away from the axis of rotation of said axially extending member, means for effecting operation of said main clutch means from the disengaged condition to the engaged condition upon outward movement of said flyweight to a predetermined position, and stop means for engaging said portion of said flyweight and for rotatably moving with said flyweight to limit the extent of said radially outward movement of said portion of said flyweight beyond said predetermined position to absorb at least a portion of the loading on said pivotal support and to prevent retardation of rotation of said flyweight by said stop means when said radially outward movement is thereby limited.

* * * * *

UNITED STATES PATENT AND TRADEMARK OFFICE
CERTIFICATE OF CORRECTION

PATENT NO. : 3,938,408
DATED : February 17, 1976
INVENTOR(S) : Jerry F. Baremor

It is certified that error appears in the above—identified patent and that said Letters Patent are hereby corrected as shown below:

Col. 3, line 39:   "on" should read---or--- line 65:   "drve" should read---drive---

Signed and Sealed this eighth Day of June 1976

[SEAL]

Attest:

RUTH C. MASON
Attesting Officer

C. MARSHALL DANN
Commissioner of Patents and Trademarks